(No Model.)

G. H. AREGOOD.
BRICK MACHINE.

No. 301,471.

Patented July 8, 1884.

Witnesses.

Inventor.
George H Aregood
per. Merriam & Whipple
Attorneys.

UNITED STATES PATENT OFFICE.

GEORGE H. AREGOOD, OF CHICAGO, ILLINOIS.

BRICK-MACHINE.

SPECIFICATION forming part of Letters Patent No. 301,471, dated July 8, 1884.

Application filed December 7, 1883. (No model.)

*To all whom it may concern:*

Be it known that I, GEORGE H. AREGOOD, of Chicago, State of Illinois, have invented a certain new and useful Improvement in Brick-5 Machines, of which the following is a specification.

The invention relates to that class of brick-machines which deliver the bricks, as made, on their sides upon an endless belt or carrier driven by mechanism operated by the machine, which carries them away to a point or place where they are to be taken off by hand and carried to the dry-kiln. In taking them off it is desirable that the bricks be turned up on their edge, as they are then in better position to be taken up by the hand without injury to the side edges; and it is the object of my invention to set them up on edge on the carrying-belt between where they are delivered upon it and the place where they are taken off.

The accompanying drawings illustrate the invention.

Figure 1:
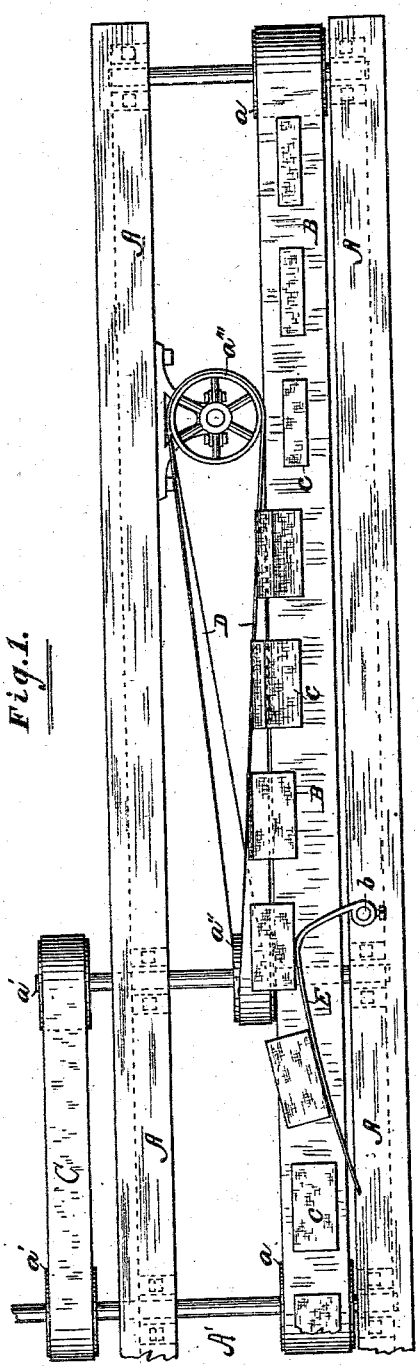
Figure 2:
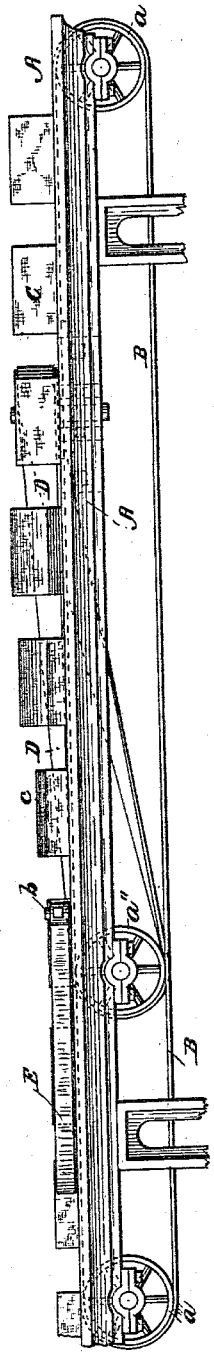

Figure 1 is a top or plan view of that portion of a brick-machine of the class named to which the invention is applied. Fig. 2 is a side elevation of the same.

A designates that portion of the frame of the machine which supports the carrying-belt B and its pulleys $a$ $a$, which are operated by mechanism (not shown) operating upon shaft A', so as to drive said belt a little faster than the movement of the bricks as they are pushed along by the machine before reaching said belt, so that when on the belt they will be a short distance apart. All of these parts are of the ordinary construction, and operate in the usual manner. To this arrangement I have added pulleys $a'$ $a'$ and belt C and the pulleys $a''$ and $a'''$ and the inclined belt D, said pulley $a''$ being in a horizontal position and $a'''$ being in a vertical position, so that the belt D is changed from a horizontal plane at $a''$ to a vertical one at $a'''$. The carrying-belt is about six inches wide, and the inclined belt is about three inches wide, and the mechanism which operates the inclined belt is such as to make it move at the same rate of speed as the carrying-belt. A guide, E, is supported at $b$ upon the frame A, and extended over the carrying-belt, and as the bricks $c$ are carried along on said belt they are slid over by the guide onto the belt D to the distance of about half their width, and are thus carried along by both belts moving together until the incline is sufficient to turn them on the edge, in which position they are no longer in contact with the inclined belt, but rest about the center of the carrying-belt, and are so carried to the place where they are to be taken off.

For the belt C and its pulleys $a$ $a$, a shaft and bevel-gears or any equivalent mechanism which will move the inclined belt at the same speed with the carrying-belt may be used, and the invention is designed to be applied to any machine of the class named to effect the result specified.

The inclined belt may be put upon the pulley $a$, where the bricks are delivered from the machine, by extending or widening the flange of said pulley, or by putting one alongside of it upon shaft A' for that purpose, in which case the delivery-point of machine might be so arranged or located with reference to the belts as to deliver the bricks from the machine upon both of said belts together in the position in which they are placed by the guide E. With such an arrangement the guide would be unnecessary.

What I claim is—

1. In a brick-machine, the carrying-belt B, in combination with an inclined belt, D, and means for delivering the bricks from the machine upon both said belts, substantially as and for the purpose specified.

2. In a brick-machine, the carrying-belt B, in combination with the inclined belt D, said belts being arranged to operate together substantially as and for the purpose specified.

GEORGE H. AREGOOD.

Witnesses:
JNO. H. WHIPPLE,
JOS. W. MERRIAM.